April 16, 1935.  W. BARNES, JR  1,998,068
HOSE RACK
Filed July 13, 1933  4 Sheets-Sheet 3
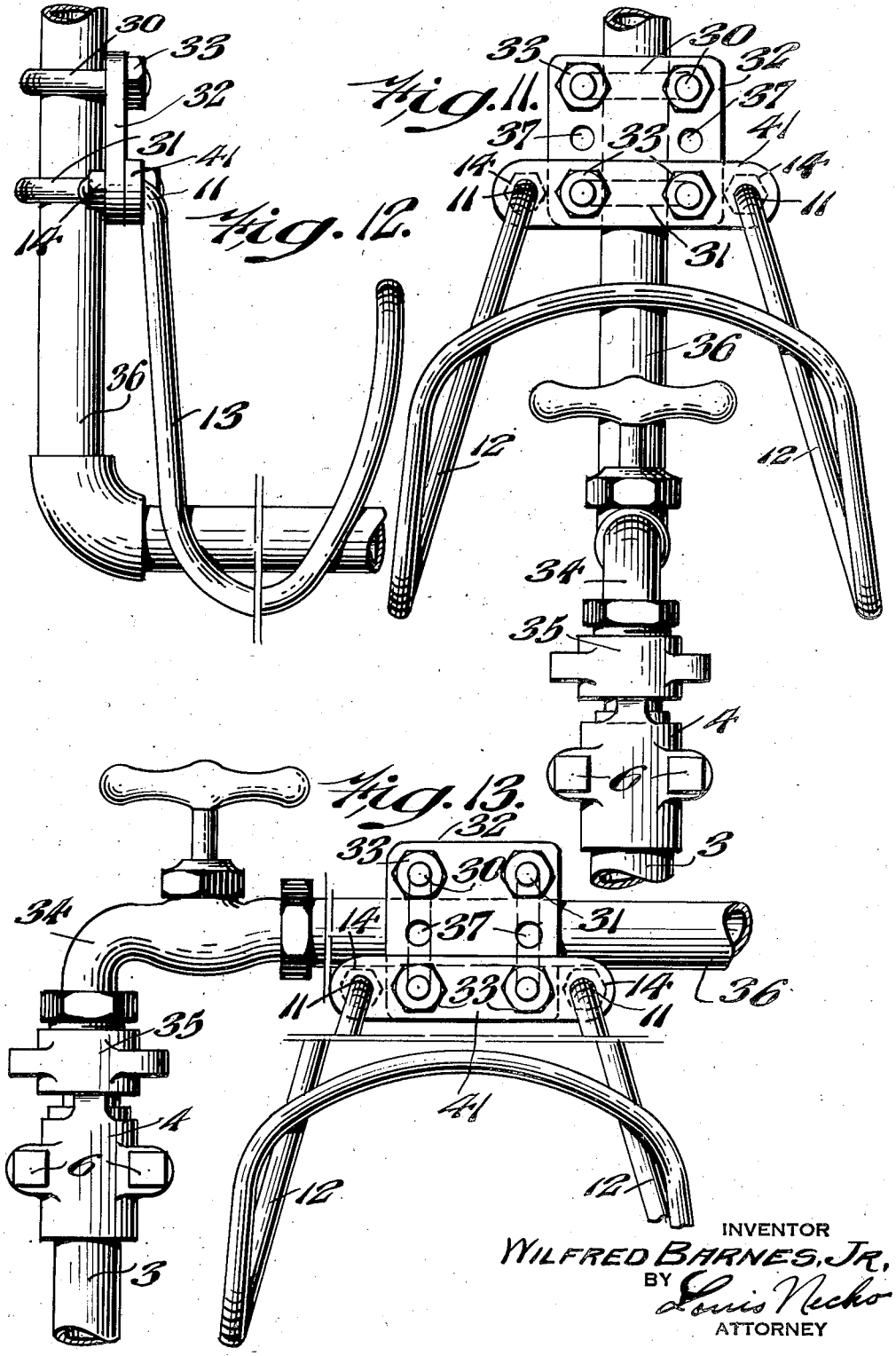
INVENTOR
WILFRED BARNES, JR,
BY
ATTORNEY April 16, 1935.   W. BARNES, JR   1,998,068
HOSE RACK
Filed July 13, 1933    4 Sheets-Sheet 4
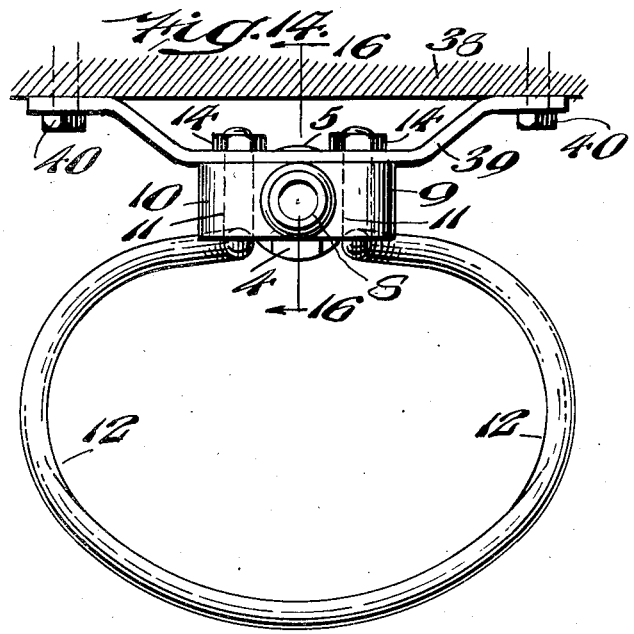
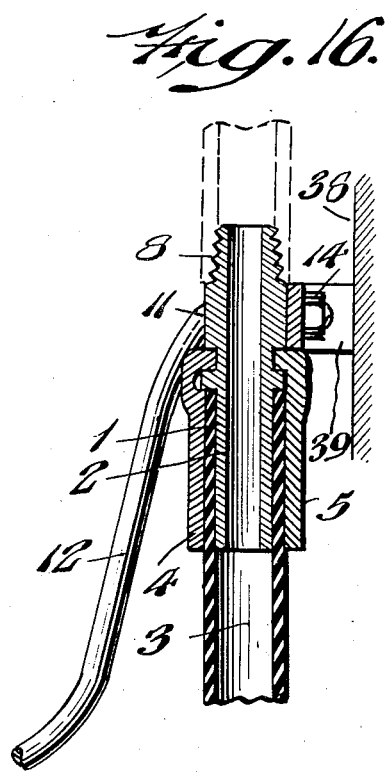
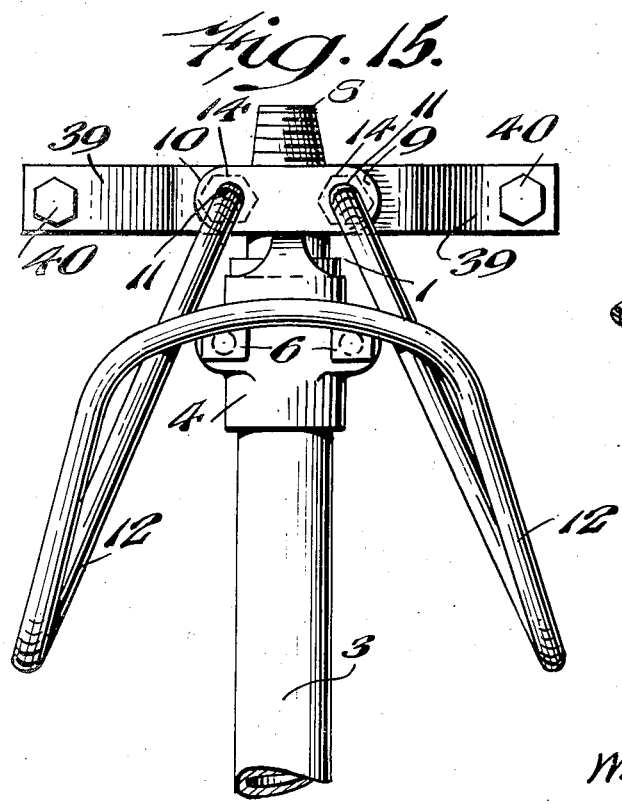
INVENTOR
WILFRED BARNES, JR,
BY
ATTORNEY Patented Apr. 16, 1935

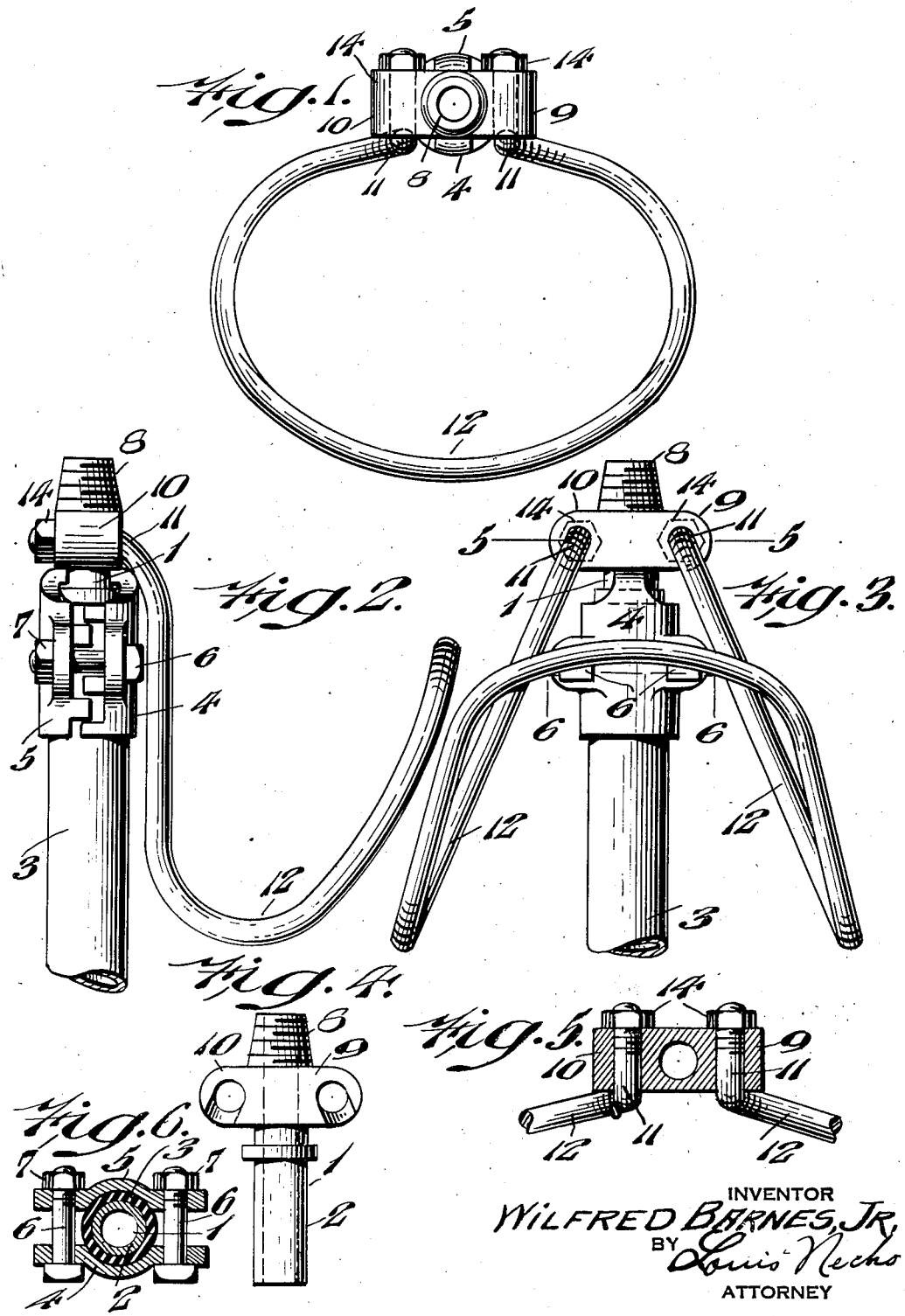

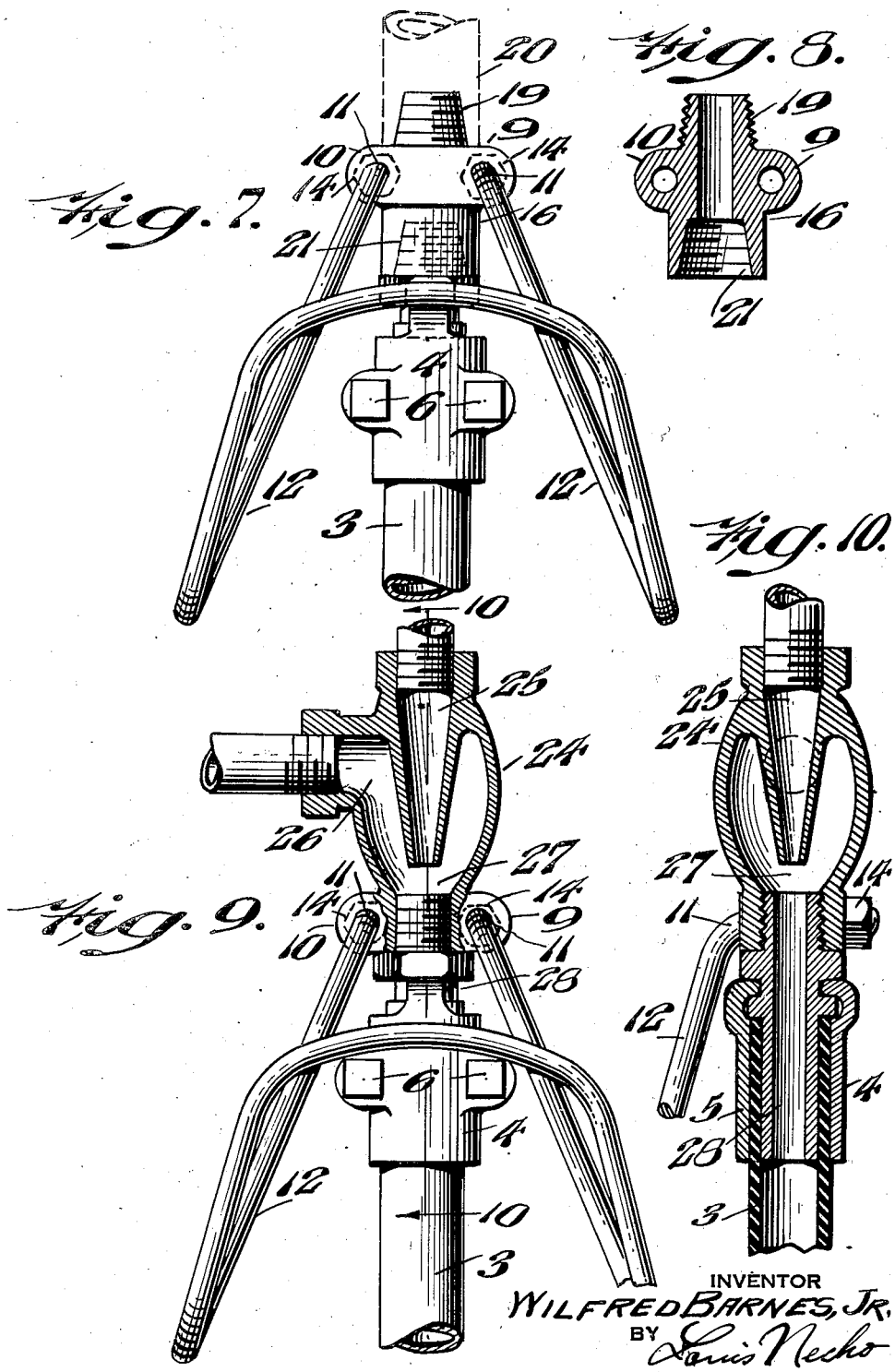

1,998,068

UNITED STATES PATENT OFFICE 1,998,068

HOSE RACK

Wilfred Barnes, Jr., Glenolden, Pa.

Application July 13, 1933, Serial No. 680,177

2 Claims. (Cl. 248—29)

My invention relates to a new and useful hose rack of the general type disclosed in my prior Patent No. 1,903,035 of March 28, 1933, the present construction being an improvement upon and an adaptation of my previous invention to facilitate the mounting or installation of the hose rack and to facilitate the coupling or connection thereof to various types of outlets or fittings.

My invention still further relates to a hose rack which embodies all of the advantages embodied in my prior patent above referred to, as well as other novel features of construction and advantages, which will be more clearly understood from the following specification and the accompanying drawings in which:

Fig. 1 represents a plan view of a hose rack embodying my invention.

Fig. 2 represents a side elevation of Fig. 1.

Fig. 3 represents a front elevation of Fig. 1.

Fig. 4 represents a side elevation of an adapter forming part of my invention shown detached.

Fig. 5 represents a section on line 5—5 of Fig. 3.

Fig. 6 represents a section on line 6—6 of Fig. 3.

Fig. 7 represents a view similar to Fig. 3 showing a modified form of construction.

Fig. 8 represents a vertical sectional view of an adapter forming part of the structure shown in Fig. 7.

Fig. 9 represents a view partly in section and partly in front elevation showing a still further modification of my invention.

Fig. 10 represents a section on line 10—10 of Fig. 9.

Fig. 11 represents a front elevation of a still further modified form of my invention showing the manner of attaching my novel hose rack to a vertical pipe.

Fig. 12 represents a fragmentary side elevation of Fig. 11.

Fig. 13 represents a side elevation of a still further modified form of my invention illustrating the application of my novel hose rack to a horizontal pipe.

Fig. 14 represents a view similar to Fig. 1 showing a still further modified form of construction.

Fig. 15 represents a front elevation of Fig. 14.

Fig. 16 represents a section on line 16—16 of Fig. 14.

Referring to the drawings in which like reference characters indicate like parts, and more particularly to Fig. 4, 1 designates any desired adapter, coupling, pipe fitting, or the like, around the lower end portion 2 of which is adapted to be clamped the inlet end of a hose 3 by means of the clamps 4 and 5 which are engaged by the bolts 6 tightened by the nut 7. The clamps 4 and 5 serve firmly and detachably to secure the inlet end of a hose 3 to the lower portion 2 of the adapter 1 in a water tight manner. The adapter 1 is provided with the threaded inlet 8 which is adapted to be threaded into any spigot or other water outlet (not shown). The adapter 1 is provided with the apertured ears or lugs 9 and 10 which are adapted to receive the rear ends 11 of the U-shaped arms 12. The rear ends 11 of the U-shaped arms 12 preferably threadedly engage the apertured lugs 9 and 10 and are retained by the nuts 14. The U-shaped arms 12 are preferably formed of a single rod twisted into the form shown and are adapted to receive and support a coil of hose (not shown).

In Figs. 7 and 8, I have illustrated the application of my novel hose rack to a male and female coupling or adapter 16 which is provided with apertured ears 9 and 10 for engaging the rear ends 11 of the U-shaped arms 12 to support the rack proper which carries the hose. The adapter or coupling shown in Fig. 8 is provided with the male externally threaded portion 19 which is adapted to engage a water outlet 20 and with the lower female internally threaded portion 21 which is adapted to be engaged by the upper externally threaded male portion 8 of the adapter illustrated in Fig. 1 or any other adapter.

In Figs. 9 and 10, I have illustrated the application of my novel hose rack to a siphon steam or air jet 24 which is provided with inlets 25 and 26 for the introduction of water and steam, or steam and air, or any other desired mixture under pressure to be forced out through the outlet 27 into the hose 3. In this construction I provide the siphon jet 24 with apertured ears 9 and 10, to which the rear ends 11 of the U-shaped arms 12 are secured. The hose 3 is clamped by means of the clamps 4 and 5, in the manner heretofore explained in connection with Figs. 1 to 6, on to any adapter or coupling 28 which threadedly engages the outlet 27 of the siphon jet 24, as clearly illustrated in Figs. 9 and 10.

In Figs. 11 and 12, I have illustrated the manner of applying my hose rack to a vertical pipe, either due to the absence of any other more desirable support or in order to support the hose near the spigot or outlet end of the pipe, and to this end I utilize one or two U bolts 30 and 31 which are adapted to project through a supporting plate 32 and to be engaged by the nuts 33. In this construction the inlet end of the hose 3, secured to a suitable adapter, is connected to a spigot or other outlet 34 by means of the female coupling 35. The spigot 34 may be the outlet of the pipe 36 which is engaged by the U bolts 30 and 31 or may be connected to a pipe other than that to which the hose rack is secured. The U-shaped arms 12 are either secured to the cross bar 41, which in turn is engaged by one of the U bolts 30 or 31, as shown in Figs. 11 and 12, or the cross bar 41 may be entirely dispensed with and the supporting plate 32 may be provided with holes 37 through which the rear ends 11 of the U-shaped arms 12 are permitted to project, to be engaged by nuts or other suitable fastening devices, as shown in Fig. 5, for instance.

In Fig. 13, I have shown the structure illustrated in Fig. 11 as applied for securing the hose rack to a horizontal pipe 36, from which it will be seen that the novel construction illustrated in Figs. 11 and 12 is reversible.

In Fig. 14, I have shown a still further modified form of my invention wherein the hose rack is secured to a wall or other support 38 by means of a bracket 39 which is secured to the wall by means of bolts or the like 40 and which is adapted to be engaged by the rear ends 11 of the U-shaped arms 12. The adapter in this construction may be of the type illustrated in Figs. 1 to 6 or it may be of any other suitable design, it being understood that I make the apertures in the supporting part of the bracket 39 to register with the apertures in the supporting plate 32 so as to enable me to use the bracket 39 in connection with the supporting plate 32 where desired.

It will thus be seen that I have devised various novel forms of my invention in a hose rack whereby the said hose rack may be easily and expeditiously connected to a water outlet, a steam jet, or a valve, by means of any suitable pipe fitting, adapter, or coupling, thereby greatly increasing the utility of my hose rack by making it readily applicable for connection to any water or other outlet regardless of the position or location of such outlet.

Having thus described my invention, what I claim as new and desire to secure by Letters Patent is:

1. A hose rack comprising a hose-supporting arm, a supporting plate, a U-shaped bolt adapted to engage a tubular support, said supporting plate having apertures therein adapted to engage the ends of said hose-supporting arm and to permit the passage therethrough of the limbs of said U-shaped bolt, and a second supporting plate having apertures therein adapted to engage the ends of said U-shaped bolt.

2. A hose rack comprising a hose-supporting arm, a supporting plate, a U-shaped bolt adapted to engage a tubular support, said supporting plate having apertures therein adapted to engage said U-shaped bolt, and a cross bar secured to said plate and engaging the ends of said arm.

WILFRED BARNES, JR.